United States Patent [19]

Morehouse et al.

[11] Patent Number: 5,289,325
[45] Date of Patent: Feb. 22, 1994

[54] RIGID DISK DRIVE WITH DYNAMIC HEAD LOADING APPARATUS

[75] Inventors: James H. Morehouse, Jamestown; David M. Furay; James A. Dunckley, both of Boulder, all of Colo.

[73] Assignee: Intégral Peripherals, Inc., Boulder, Colo.

[21] Appl. No.: 629,957

[22] Filed: Dec. 19, 1990

[51] Int. Cl.⁵ ............................................. G11B 5/54
[52] U.S. Cl. ................................. 360/105; 360/98.07
[58] Field of Search .................... 360/104, 105, 106

[56] References Cited

U.S. PATENT DOCUMENTS

| | | | |
|---|---|---|---|
| 3,984,873 | 10/1976 | Pejcha | 360/105 |
| 4,535,374 | 8/1985 | Anderson et al. | 360/105 X |
| 4,683,506 | 7/1987 | Toldi et al. | 360/105 |
| 4,752,848 | 8/1988 | Garcia et al. | 360/105 |
| 4,870,703 | 9/1989 | Augeri et al. | 360/105 |
| 4,933,785 | 6/1990 | Morehouse et al. | 360/105 X |
| 5,023,737 | 6/1991 | Yaeger | 360/105 |
| 5,027,241 | 6/1991 | Hatch et al. | 360/105 |
| 5,034,837 | 7/1991 | Schmitz | 360/105 |

OTHER PUBLICATIONS

2 Photographs (Item 16a and 16b); drawing (Item 16c); and a brochure (Item 16d) of PrairieTek Corporation's rigid disk drive model 120.

*Primary Examiner*—John H. Wolff
*Attorney, Agent, or Firm*—Skjerven, Morrill, MacPherson, Franklin & Friel

[57] ABSTRACT

A rigid disk drive including a rotary actuator having a lift tab extending asymmetrically from the end of the load beam which supports a slider with read/write element is disclosed. The free end of the lift tab cooperates with a cam surface on a cam assembly to provide dynamic loading and unloading of the slider while imparting a roll to the slider as it is loaded to and unloaded from the disk.

14 Claims, 6 Drawing Sheets

RIGID DISK DRIVE WITH DYNAMIC HEAD LOADING APPARATUS

BACKGROUND OF THE INVENTION

1. Field of the Invention

This invention relates to the field of information storage utilizing rigid disks, and more particularly to apparatus for dynamically loading and unloading read/write magnetic recording elements for flight above the surface of moving magnetic media.

2. Description of the Prior Art

In certain types of disk files which include rigid magnetic media it is desirable to load and unload a magnetic recording reproducing element into flight above the surface of the moving media as opposed to utilizing take off from and landing on the magnetic media where the magnetic recording element comes to rest on the disk after rotation has ceased and takes off from the disk after the disk is once again spun up. U.S. Pat. No. 4,535,374 to Anderson et al., issued Aug. 13, 1985, is exemplary or a rigid disk drive of the linear actuator type which provides for dynamic loading of magnetic read/write heads above the surface of a disk. In Anderson et al. a stationary cam follower is provided on and supported from the housing, and the load arm, which includes a magnetic recording head at its free end, is provided with a cam surface intermediate the free end and the end supported by the actuator. The cam surface cooperates with a stationary cam to lift the head above the surface of the disk when the head arm is retracted.

Another linear actuator rigid disk drive utilizing a cam arrangement to achieve dynamic loading of the magnetic recording head above the disk is illustrated in U.S. Pat. No. 4,663,682 to McNeil, issued May 5, 1987. In McNeil, a pair of cam surfaces are supported by the disk drive housing and a wing, having a pair of free ends, is attached to the load beam intermediate the actuator driving mechanism and the free end of the load beam which supports the head slider. The free ends of the wing cooperate with the cam surfaces to lift the magnetic recording head slider above the surface of the disk when the head arm is retracted. In McNeil, the direction of movement of the magnetic media beneath the magnetic recording head is such that the media is moving in a direction which is parallel to the longitudinal axis of the slider on which the magnetic recording element is supported and perpendicular to the longitudinal axis of load beam. The cam surfaces in McNeil are offset and provide pitch to the slider during the loading process when the slider is approaching the surface of the rotating media.

U.S. Pat. No. 4,933,785 to Morehouse et al., issued Jun. 12, 1990, and assigned to Prairietek Corporation, discloses a magnetic disk drive utilizing a rotary actuator. The load beams (which support the read/write elements) each include a lift button which is supported on the load beam, and positioned on the longitudinal axis of the load beam. The lift buttons cooperate with a spreader, which includes cam surfaces, to provide dynamic loading and unloading of the slider which is supported on the end of the load beam opposite of the pivot point of the load beam. The buttons and the cooperating spreader with cam surfaces are located intermediate the pivot point of the rotary actuator and the magnetic head. The button and cam surface on the spreader provide a symmetrical lift to the load beam and correspondingly symmetrical loading of the magnet head above the media, which in this configuration is rotating in the direction beneath the head which is substantially parallel to the longitudinal axis of the load beam which is supporting the slider.

A later introduced rigid disk drive from Prairietek Corporation, utilized a dynamic loading structure having a cam surface supported on the housing which contacted directly the load beam of the rotary arm having the magnetic slider on its free end. In this Prairietek hard disk drive, denominated the model 120, the cam is supported on the housing and is positioned intermediate the head slider and the pivot point of the rotary actuator. The principle distinction between the dynamic loading structure in the model 120 over the structure illustrated in the '785 patent is the elimination of the button which was included on the load beam and provided a center line lift on the load beam. In the model 120 disk drive a heavy roll torque is applied to the load beam and there is no ability to change the amount of torque and correspondingly the roll applied to load beam.

U.S. Pat. No. 3,984,873, issued Oct. 5, 1976 to Pejcha illustrates a structure for dynamically loading heads, which in one embodiment utilizes a movable channel member which is supported above the surface of the rotating rigid disk. The loading of a head above the surface of the disk is achieved by providing flat spring extensions which extend symmetrically from the free end of the load beam and are captured in the channel which is positioned in a plane above the surface of the disk such that the opening is generally parallel to the plane of the disk. With the spring extensions captured in the channel, the heads are prevented from being loaded on the disk. To load the heads the channel member is moved out of contact with the flat spring extensions and the heads move toward the surface of the associated disk. In another embodiment, the flat spring extensions on the ends of the load beam are crisscrossed and a pivoted member is moved into contact with the crisscrossed free ends to unload the heads from the disk. In a third embodiment, a cam surface is provided adjacent to the edge of the rotating disk and the magnetic head is supported on a spring member which is affixed by bolts to a rotating arm. An extension of the spring member on the end adjacent to the magnetic head is positioned at right angles with respect to the center line of the rotary arm on which the head and spring is mounted, with the spring extension having a longitudinal axis which is parallel to the longitudinal axis of the cam surface.

SUMMARY OF THE INVENTION

An object of the present invention is to provide a rigid disk drive which includes a dynamic head loading structure which imparts a roll to the head slider as it is being loaded onto a rotating disk. Another object of the present invention is to provide means to control the dynamic head loading structure such that the amount of roll imparted to the head slider is adjustable. A further object of the present invention is to provide a dynamic head loading structure for a rotary actuator in which the rotary actuator can be loaded into operative relationship with a cam assembly from the back side of the cam assembly to simplify the initial assembly of the rotary actuator structure in the drive as well as avoiding damaging the disk surface. A further object of the present invention is to provide a dynamic loading structure which is uncomplicated and can be constructed from readily available components. A further object of the present invention is to provide a means to protect the magnetic heads of a rigid disk drive which are facing when the heads are unloaded from the surface of the disk.

In accordance with the present invention, a lift tab is provided on the free end of an actuator arm which supports a slider for travel on an air bearing above the surface of a rigid magnetic recording disk. The lift tab is positioned such that is extends from the free end of the actuator arm at an angle which is skewed from the longitudinal axis of the actuator arm. The lift tab cooperates with a cam surface (which is supported on the baseplate) and as a result of the asymmetrical location of the lift tab with respect to the longitudinal axis of the actuator arm, the actuator arm is pivoted, which provide, a roll orientation to the slider as it is loaded onto the disk.

BRIEF DESCRIPTION OF THE DRAWINGS

Other objects and advantages of the invention will become apparent from a study of the specification and drawings in which.

DETAILED DESCRIPTION OF THE INVENTION

Figure 1:
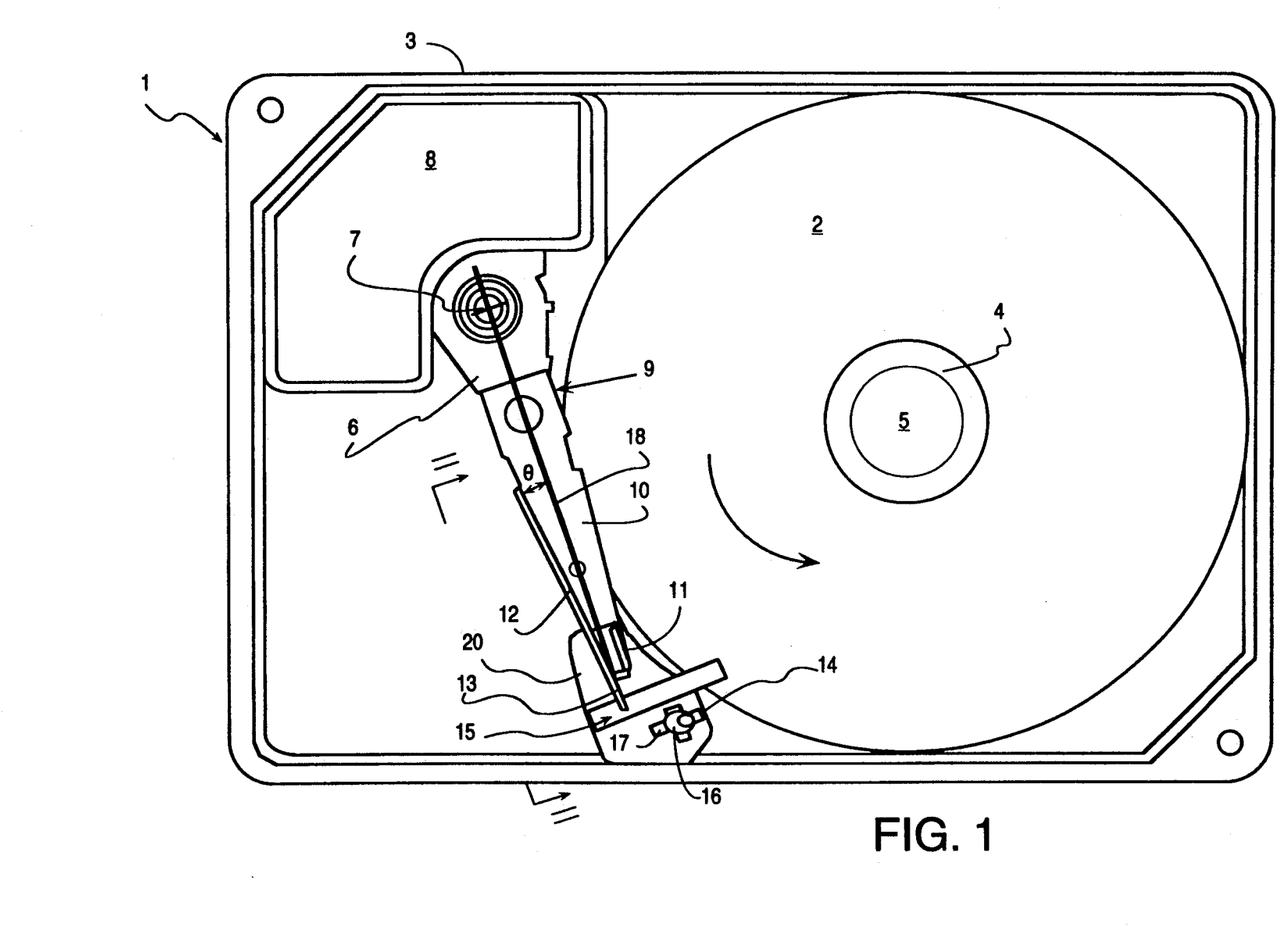
FIG. 1 is a top plan view of a rigid disk drive incorporating the dynamic head loading apparatus in accordance with the present invention.
Figure 2:
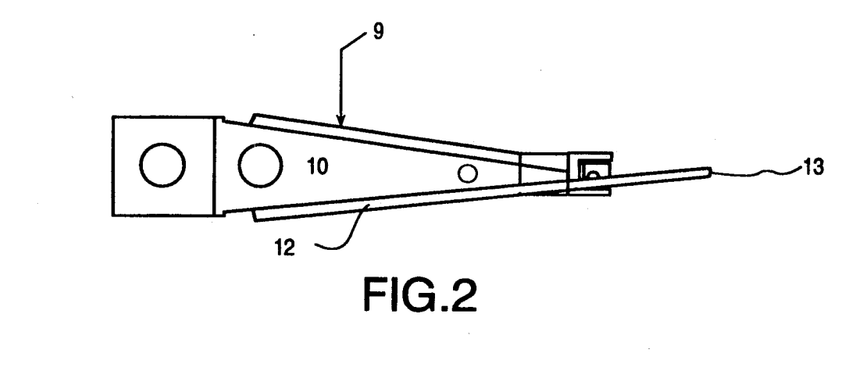
FIG. 2 is a top plan view of the down-facing head gimbal assembly utilized in the rigid disk drive of FIG. 1.
Figures 3, 4:
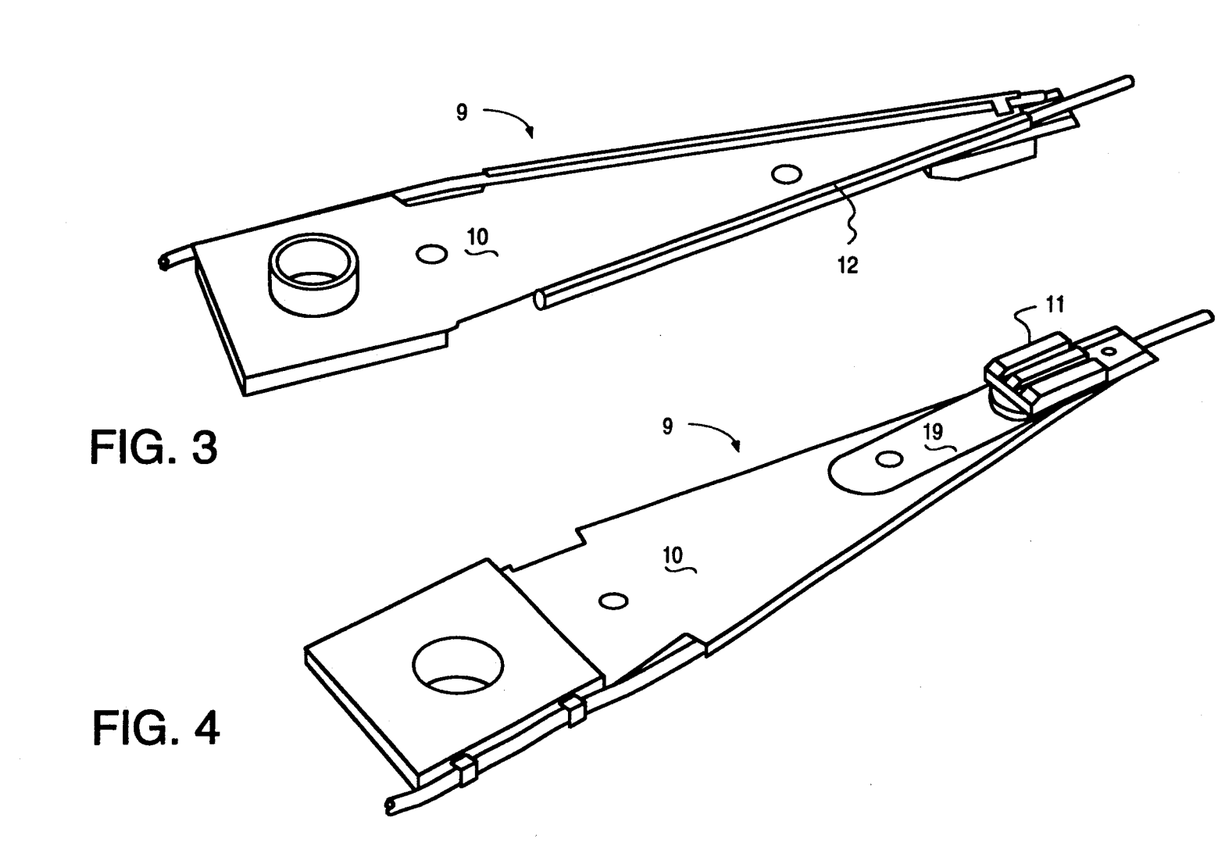
FIG. 3 is a perspective view of the head gimbal assembly of FIG. 2.
FIG. 4 is a perspective view of the lower side of the head gimbal assembly illustrated in FIG. 3.
Figure 9:
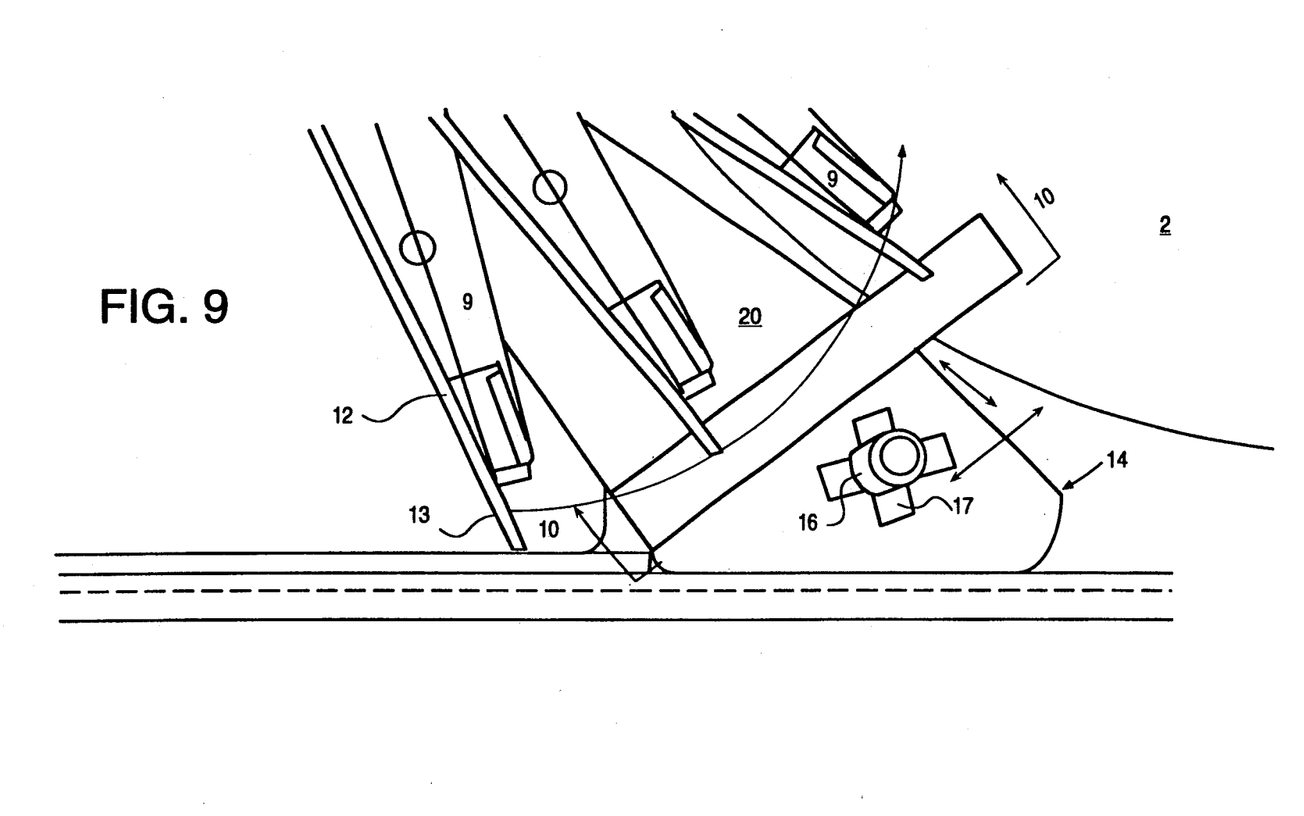
FIG. 9 is a highly enlarged view of a portion of the disk drive illustrated in FIG. 1 showing the head gimbal assembly in a plurality of locations in its travel with respect to the cooperating cam assembly.

Referring to FIG. 1, rigid disk drive 1 in accordance with the present invention illustrated in a top plan view. Rigid disk drive 1 is illustrated in highly enlarged scale for illustrative purposes. Included in rigid disk drive 1 is rigid disk 2, which may include magnetic coated surfaces for the recording and reproduction of digital information. Rigid disk 2 is supported for rotation by a suitable motor and spindle combination (not shown). Clamp 4 secures rigid disk 2 to hub 5 of the motor for rotation with the rotor portion of the motor. Rigid disk drive 1 utilizes a rotary actuator which includes actuator body 6 which rotates about a center of rotation 7. A suitable coil and permanent magnet motor (not shown) of the type well known in the art are positioned beneath return plate 8 of the permanent magnet actuator motor assembly. Although in the disclosed embodiment of the invention a permanent magnet motor is used to position the actuator, other types of suitable drive mechanisms may be used for moving the rotary actuator. Head gimbal assembly 9 is secured to actuator body 6 and rotates about center of rotation 7. Head gimbal assembly 9 includes a generally flat, triangular shaped load beam 10 which supports near its free end a slider body 11 which includes a read/write element for writing information to and reading information from magnetic recording disk 2. Attention is directed to FIGS. 2, 3 and 4 where additional views of head gimbal assembly 9 are illustrated. In accordance with the present invention, a second head gimbal assembly may be utilized beneath the surface of rigid disk 2 to provide for record and reproduction of data on the lower surface of rigid disk 2. Head gimbal assembly 9 includes lift tab 12, which in the embodiment illustrated comprises a rod, which is suitably affixed to the upper surface of load beam 10. Alternatively, the lift tab could be formed integrally with the load beam. Although in the embodiment illustrated herein lift tab 12 is positioned on the side of load beam 10 which is beyond (with respect to the center of disk 2) center line 18, lift tab 12 could be positioned on the other side of center line 10 (that is between center line 18 and the edge of load beam 10 which is nearer the center of disk 2). Supported in operative relationship with the free end 13 of lift tab 12 is a cam assembly 14 which is supported on baseplate 3. Included on cam assembly 14 is cam surface 15, the contour of which will be best appreciated by reference to FIG. 6. Load beam 10 of head gimbal assembly 9 provides a downward force (when viewed as illustrated in FIG. 1) which maintains free end 13 of lift tab 12 in contact with cam surface 15. As will be appreciated by reference to FIGS. 1, 5 and 6, a portion of cam surface 15 extends over the upper surface of rigid disk 2. Cam assembly 14 is affixed to baseplate 3 using a suitable fastening means, such as a bolt 16 having a threaded end (not shown) which cooperates with a threaded opening (not shown) in baseplate 3. As illustrated in FIGS. 1 and 9, cross-shaped slot 17 permits adjustment of cam assembly 14 in the directions indicated by the arrows in FIG. 5. Adjustability of cam assembly 14 in the direction of arrows which we generally radial with respect to the disk provides the ability to vary the landing position of the slider on the disk and thereby compensate for manufacturing tolerances. Load beam 10 may be constructed of 0.0025" thick, 300 series stainless steel, although other material may be utilized. In the embodiment illustrated herein, lift tab 12 comprises a stainless steel rod and Delrin (an acetal resin compound) is used for cam surface 15. This combination of materials provides a low friction interface, however it will of course be appreciated that other combinations of materials may be utilized. Other suitable low friction materials, such as an acetal resin compound impregnated with PTFE, or other plastic material with low friction characteristics could alternatively be used for cam surface 15. A suitable adhesive, such as an epoxy, is used to secure the stainless steel rod. to load beam 10. An alternate construction would be to weld or braze rod 12 to load beam 10.

The center line of load beam 10 (indicated in FIG. 1 by reference character 18) passes through center of rotation 7 of rotation of rotary actuator 7 and extends to the free end of load beam 10. In the present embodiment, as will be appreciated by reference to FIG. 1, the center line of lift tab 12 is not parallel to center line 18 of load beam 10. The angle of deviation between center line 18 of load beam 10 and the center line of lift tab 12 is indicated in FIG. 1 by the greek letter theta ($\theta$). In the embodiment illustrated herein, lift tab 12 extends along one edge of load beam 10, however other variations may be utilized and it is not essential to the practice of the invention that lift tab 12 have its central axis parallel with an edge of load beam 10. The important relationship to be maintained with respect to the center line of lift tab 12 and the center line of load beam 10 is that the angular relationship of lift tab 12 provide an asymmetrical lifting force on load beam 10 to provide a roll attitude to slider 11 as it approaches the surface of rigid disk 2 during loading of slider 11 above disk 2. As will be described more fully hereinafter, the roll applied to the slider may be either "positive" or "negative" and both provide advantageous results. After lift tab 12 has been moved out of contact with cam surface 15, load beam 10 (and slider 11) assume an attitude such that the lower surface of slider 11 and the lower surface of load beam 10 are substantially parallel to the plane of the surface of disk 2.

Referring to FIG. 3, head gimbal assembly 9 is illustrated in perspective and it will be appreciated that lift tab 12 extends angularly with respect to the center line of load beam 10. Head gimbal assembly 9 may also be referred to as the "down" assembly since the read/write element (not shown) which is supported on slider body 11 faces down toward the upper surface of rigid disk 2 as is illustrated in the orientation in FIG. 1. With lift tab 12 in the orientation in FIG. 3, the downward force of load beam 10 tilts the inner edge of the slider 11 closer to the surface of disk 2 than the outer edge of slider 11 torque valve thereby imparting a positive roll to slider 11.

Referring to FIG. 4, which is a view of the underside of head gimbal assembly 9 illustrated in FIG. 3, slider body 11 is supported on flexure 19 for gimbaling movement above the surface of the disk 2. Head gimbal assembly 9 is of the Watrous-type, or also known as Whitney type suspension; however, the particular type of suspension is not relevant with respect to the present invention. Other suitable slider support arrangements may be utilized to couple slider 11 to actuator body 6. The asymmetrical relationship between the axis of lift tab 12 and the center line of head gimbal assembly 9 may also be appreciated by reference to FIG. 2 which is a top plan view of head gimbal assembly 9.

Figure 5A:
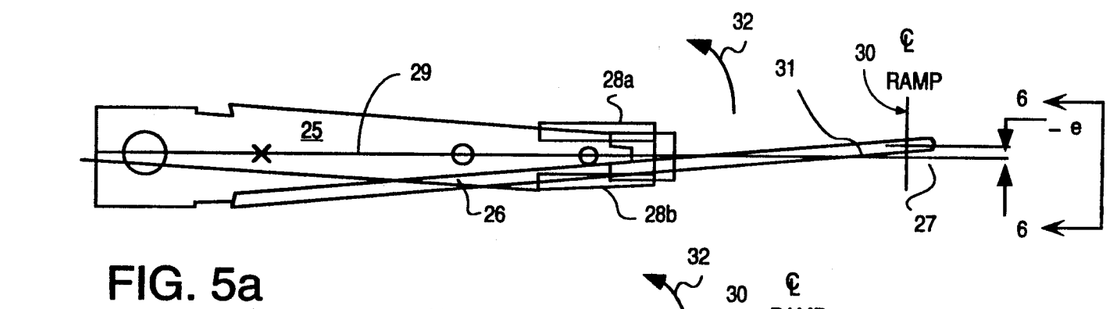
FIGS. 5a-5c illustrate the structure for achieving negative roll, no roll and positive roll for a slider supported on a head gimbal assembly.
Figure 5B:
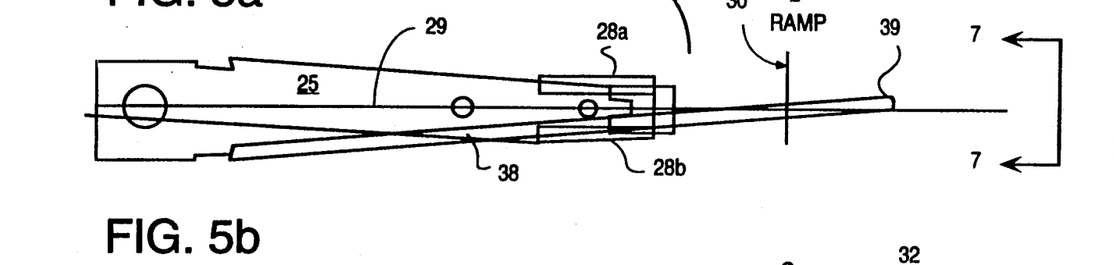
Figure 5C:
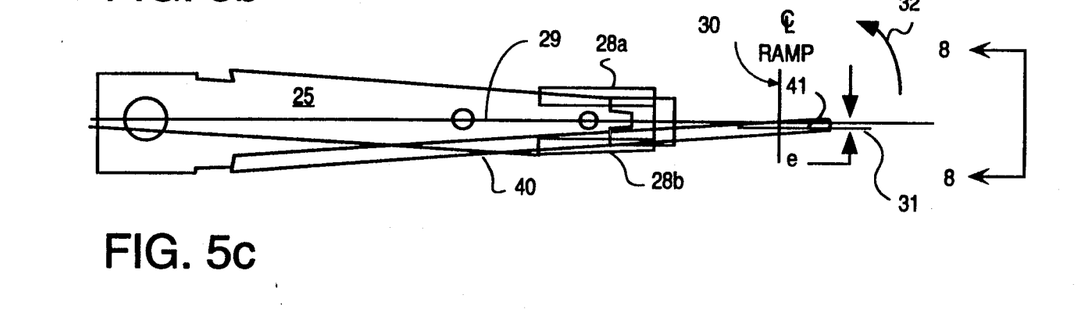
Figure 6:
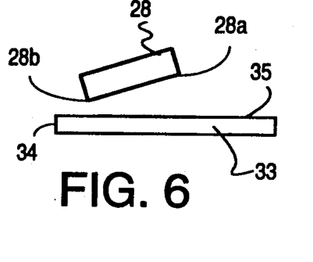
FIGS. 6 to 8 illustrate, respectively, a slider having a negative roll, no roll and positive roll attitudes.

Attention is directed to FIGS. 5a, 5b, 5c and 6-8 wherein the relationship between the lift tab and center line of the load beam to which it is affixed, or of which it is a part, will be described to illustrate how a negative roll, no roll or a positive roll attitude is provided to the slider affixed to the load beam. First, referring to FIG. 5a, load beam 25 is illustrated, and includes lift tab 26 having a free end 27. Supported near the end of load beam 25 is slider 28 which is obscured by load beam 25, however edges 28a and 28b (also shown in FIGS. 6-8) are visible in this view. For convenience of explanation, load beam 25 is analogous to load beam 10 of the previous figures and is a "down" load beam. The center line of load beam 25 is indicated by reference character 29. With this configuration, the lift tab 26 extends outwardly and contacts a cam surface (not shown) along a center line 30. Line 31 indicates the point of contact between free end 27 of lift tab 26 and center line 31 of cam surface. It will be appreciated by reference to FIG. 5a that the intersection between the cam center line (indicated by reference character 30) and the contact point, indicated by line 31, of lift tab 26 is displaced from center line 29 of load beam 25. The amount of deviation is indicated by the arrows pointing to the center line of load beam 25 and the line of contact between lift tab 26 and the cam surface. As shown in FIG. 5a, this distance denoted as "$-e$" indicates the eccentricity of the geometry. The loading direction of slider 28 onto a disk is indicated by the arrow denoted by reference character 32. With the relationships indicated in FIG. 5a, a "negative" roll is imparted to slider 28 as is loaded onto a surface of a disk (not shown in FIG. 5a). Attention is directed to FIG. 6, which is a view taken along the lines 6—6 of FIG. 5a, which illustrates what is meant by a negative roll attitude which is imparted to slider 28 as it is being loaded above disk 33, the outer edge of which is indicated by reference character 34. As will be appreciated by reference to FIG. 6, edge 28a of slider 28 (which is nearer the center of disk 33 than is edge 28b) is higher above surface 35 than is edge 28b. By adjusting the point of contact between free end 27 of lift tab 26 and the contact point on the cam surface (not shown), the eccentricity value will be changed and similarly the roll attitude of slider 28 will also be changed. In the rigid disk drive of FIG. 1, this adjustment is achievable by use of cross-shaped slot 14 on cam assembly 17.

Referring to FIG. 5b, for illustrative purposes a no roll embodiment is illustrated. In FIG. 5b, load beam 25 is provided with lift tab 38 having free end 39, and lift tab 38 is dimensioned such that free end 39 contacts the cam surface (not shown) at intersection line center line 29 of load beam 25. Since the cam surface contact corresponds to the center line of load beam 25 no torque is applied to load beam 25 and accordingly no roll results. Therefore, as will be appreciated by reference to FIG. 7, upon loading of slider 28 above surface 35 of disk 33 edge 28a of slider 28 is approximately the same distance from surface 35 as is edge 28b, accordingly this is a "no roll" or zero roll loading attitude. As will be more fully pointed out hereinafter, it is desirable that when loading a slider that either a positive or negative roll be applied; however, the no roll or zero roll attitude is described for explanatory purposes.

Figure 7:
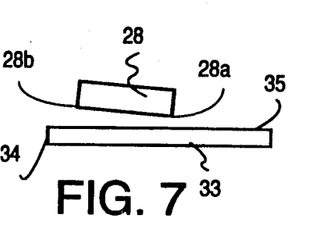
Figure 8:
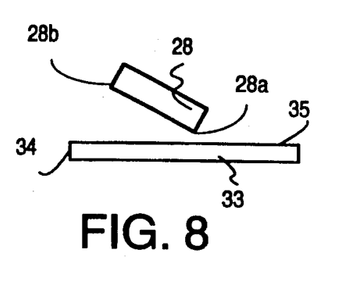

Referring to FIG. 5c, along with FIG. 8, a positive roll implementation of a load beam with lift tab is illustrated. In FIG. 5c, lift tab 40 is shorter in length than either of lift tabs 38 or 26. Therefore, when free end 41 of lift tab 40 intersects the cam (not shown) at cam center line 31 the deviation between center line of load beam 25 and point of contact along cam center line 30 between the free end 41 of lift tab 40 provides a torque which lifts edge 28b higher above surface 35 of disk 33 than edge 28a as a result of the off center lifting provided by eccentricity "e". Referring to FIG. 8, it will be appreciated that edge 28a of slider 28 is nearer the surface 35 of disk 33 than is edge 28b (which is near outer edge 34 of disk 33). As pointed out above, a positive roll attitude (as illustrated in FIG. 8), or a negative roll attitude (as illustrated in FIG. 6), are preferable to a no roll attitude as illustrated in FIG. 7. It will be appreciated that the lift tab utilized on the load beam could be positioned on the other side of the center line and by appropriately adjusting the length of the lift tab to achieve the contact point with the cam surface positive, negative and no roll attitudes may be achieved.

The resulting torque is given by the following formula:

Torque (T) = preload × eccentricity where: preload = force exhibited by the load beam; and eccentricity = offset distance.

It has been found that the upper limit on torque is approximately 8-10 gm-cm. The preferable values for a device according to applicants' invention is in the range of $-0.5$ gm-cm $<T<T+0.5$ gm-cm. The "$-$" and in the foregoing range indicates negative and positive roll respectively. It will of course be appreciated that other torque values may be appropriate for different load beam structures.

Figure 10:
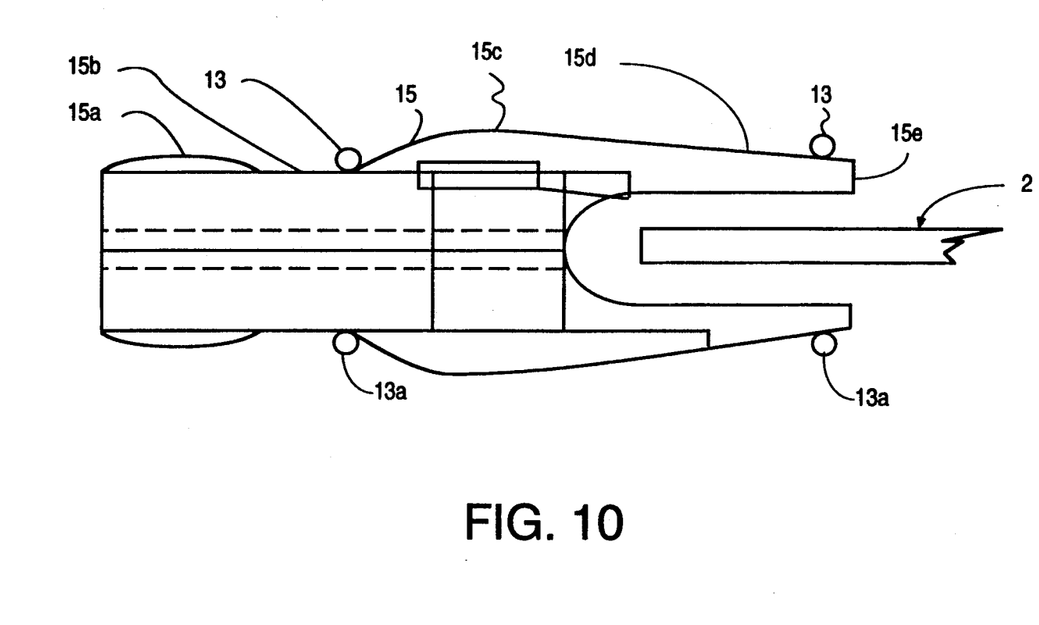
FIG. 10 is a cross-sectional view taken along the lines 10—10 in FIG. 5.

Referring to FIG. 9, a highly enlarged portion of rigid disk drive 1 (in top plan view) adjacent to the end of head gimbal assembly 9 which supports slider 11 is illustrated. In FIG. 9, head gimbal assembly 9 is illustrated in three positions for purposes of illustrating how the head gimbal assembly 9 is initially loaded and placed into position for cooperation with cam assembly 14 and further how, as best illustrated in FIG. 10, head gimbal assembly 9 and a lower head gimbal assembly if utilized, cooperates with cam assembly 14 for the dynamic loading and unloading of the sliders supported on the ends of respective head gimbal assemblies 9. The position of head gimbal assembly 9 to the left-most portion of FIG. 9 is the beginning load position after installation of the rotary actuator into the drive for initial assembly purposes. This initial installation position is illustrated in the left-hand portion of FIG. 9 in which, it will be appreciated by reference to the figure, that free end 13 of lift tab 12 is unrestrained. Head gimbal assembly 9 is rotated in a counter-clockwise direction and free end 13 of lift tab 12 travels over lobe portion 15a (as illustrated in FIG. 6) and with no further force being applied to rotate head gimbal assembly 9 free end 13 comes to rest in the detent position in valley portion 15b of cam surface 15. In FIG. 9, this position is illustrated as the central position of the three positions of head gimbal assembly 9. This is the at rest (or unloaded) position for head gimbal assembly 9 and is where the assembly would be located prior to loading the heads on the disk. In operation, during start-up power is applied the drive motor and rigid disk 2 is brought up to rotational speed after which suitable current is applied to the coil of the drive motor for the rotary actuator and head gimbal assembly 9 is rotated in a counter-clockwise direction during which free end 13 moves to the right as viewed in FIGS. 9 and 10), travels over lobe portion 15c and then down descending portion 15d of cam surface 15 to the position illustrated in the right-most portion of FIGS. 9 and 10 where slider 11 moves adjacent to the surface of disk 2. As a result of the asymmetrical position of lift tab 12 on load beam 9, during this loading operation the edge of slider 11 closer to the inner diameter of disk 2 will be lower than the edge of slider 11 nearer the outer diameter of disk 2. This provides a positive roll attitude to slider 11. It will be recalled from above that a positive roll is the type illustrated in FIG. 8.

Even though the dynamically loaded head does not contact the disk directly, after several thousand load-/unloads a small amount of wear which appears as edge blending at one corner or edge of the head is evident. This blending is caused by the head contacting the higher asperities (4 to 8 microinches high) on the disk and burnishing them off. Once the burnishing has occurred, both the lower asperity height and blended head no longer contact each other and wear does not progress. The head has sustained some minor wear (1 to 10 microinches) at a position of initial approach to the disk. This wear can be at a sensitive area of the head or an insensitive area. The tunable roll feature of the present invention permits controlling the location of the blending and guaranteeing that it occurs at a non-sensitive area.

The read/write element is generally located at the rear of the slider in order to be as close as possible to the magnetic media (most often 5 to 10 microinches flying height). If the blending occurs at the read/write gap, a change in gap separation may occur, changing the magnetic performance of the head. However, if the blending occurs along an edge of the air bearing, the flying height of the whole head is little affected since its surface area is very large compared to the blended area. By introducing some roll into the head during loading and unloading, the blending is forced away from the sensitive area and the system integrity is improved.

Referring to FIG. 10, the slope of portion 15d of cam surface 15, measured with respect to the surface of rigid disk 2, may be in the range of from about 0.7° to 18°. The preferable range has been found to be between about 9° to 12°. As will be appreciated by reference to FIG. 10, rigid disk 2 extends at its outer periphery interiorly at the end 15e of cam surface 15, as well as interiorly of the lower cam surface (not numbered). Adjustability of cam assembly 14 in the direction generally radial to rigid disk 2 permits, as will be appreciated by reference to FIGS. 9 and 10, adjustment of the landing position of slider body 11 on the surface of rigid disk 2.

Figure 11:
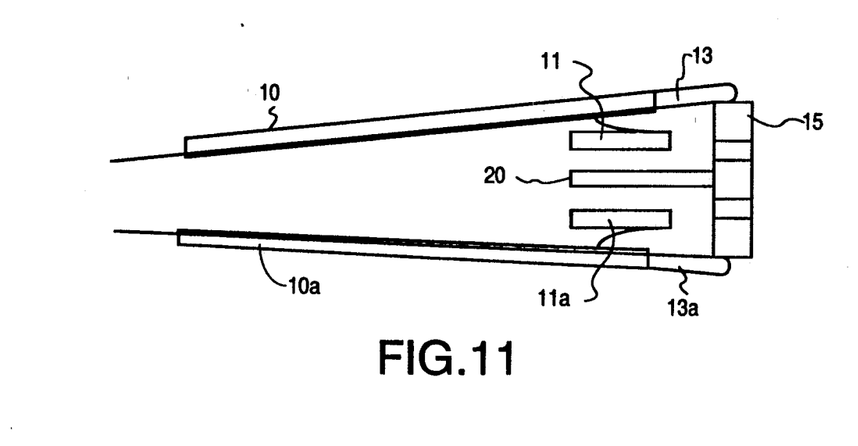
FIG. 11 is a cross-sectional view taken along the line II—II of FIG. 1.

As mentioned previously, a second head gimbal assembly may be supported beneath head gimbal assembly 9. By utilizing a similar support arrangement to that used for head gimbal assembly 9, the second head gimbal assembly with its associated slider and read/write element may be dynamically loaded into operative relationship with the lower surface of disk 2. In FIG. 10 reference characters 13a indicate the respective detent and load positions of the end of a lift tab used on a lower gimbal assembly. When upper and lower actuator arms are utilized, it is desirable to include protective member 20 (illustrated in FIGS. 1, 9 and 11) which extends intermediate the upper and lower head gimbal assemblies and is positioned in a plane generally parallel with the plane of disk 2. Referring to FIG. 11, a view along the lines of 11—11 of FIG. 1 is provided to better illustrate protective member 20. In FIG. 11, up load beam 10a along with its associated up slider 11a and free end 13a of up load beam 10a are illustrated, along with load beam 10, down slider 11 and lift tab 12 with its free end 13, all in the unloaded position. For simplification of view, rigid disk 2 and the remaining portion of cam assembly 14 are not shown in FIG. 11. It will be appreciated by a reference to FIG. 11 that protective member 20 prevents the unwanted impact between slider 11 and slider 11a should a shock be transmitted to disk drive 1 while the sliders are in the unloaded position. When the head gimbal assemblies are positioned outside of the travel above the surface of disk 2, by utilizing protective member 20 shocks which may be transmitted to disk drive 1 which would move flexure 19 and would otherwise cause slider 11 to impact up slider 11a of up load beam 10a are no longer a problem since protective member 20 prevents slider-to-slider impacts. Without the use of protective member 20, the read/write elements on their respective sliders may be damaged. Protective member 20 also limits destructive overtravel of flexure 19. Protective member 20 may either be a separate planar structure or formed as part of cam assembly 14. When formed as part of cam assembly 14 it would of course be constructed of the same material; however, if a separate member is utilized, it is preferred that it be composed of a soft resin impregnated with PTFE (which is also referred to by the tradename Teflon).

Those skilled in the art will of course appreciate that the various modifications may be made to our invention without departing from the spirit and scope thereof and that the foregoing description is illustrative of several embodiments of our invention, however the scope of our invention is governed by the appended claims.

We claim:

1. A rigid disk drive comprising:
   a baseplate;
   a rigid disk supported on said baseplate for
   an elongated actuator arm including a load beam, said actuator arm being pivotally supported about a center of rotation on said baseplate for rotation of one end of said arm load beam in a plane substantially parallel to a surface of said disk, said load beam including at its outermost end a lift tab extending from said one end of said load beam along an axis of which is skewed from the longitudinal axis of said actuator arm;
   a slider body including a read/write recording element;
   means connected to said load beam and said slider body for supporting said slider body at a position intermediate said center of rotation and said lift tab; and
   a cam assembly supported on said baseplate adjacent to said lift tab and the edge of said disk, said cam assembly including a cam surface positioned in operative relationship with said lift tab, said lift tab contacting said cam surface and in cooperation with said cam surface providing a lifting force to said load beam.

2. A rigid disk drive according to claim 1, wherein said cam surface includes a contour which permits rotational movement of said actuator arm in a direction opposite to the direction of rotation of said actuator arm during positioning of said slider body over the surface of said rigid disk and in an amount sufficient to permit installation of said rigid disk without interference with said actuator arm.

3. A rigid disk drive according to claim 1, wherein said lift tab contacts said cam surface at a position such that a positive roll attitude is imparted to said slider body during positioning of said slider body over the surface of said rigid disk.

4. A rigid disk drive according to claim 1, wherein said lift tab contacts said cam surface at a position such that a negative roll attitude is imparted to said slider body during positioning of said slider body over the surface of said rigid disk.

5. A rigid disk drive according to claim 3, wherein said cam assembly is movable with respect to said center of rotation of said actuator arm whereby the distance between the center of rotation and a contact position between said cam surface and said lift tab is variable to permit adjustment of the amount of roll imparted to said slider body.

6. A rigid disk drive according to claim 4, wherein said cam assembly is movable with respect to said center of rotation of said actuator arm whereby the distance between said center of rotation and a contact position between said cam surface and said lift tab is variable to permit adjustment of the amount of roll imparted to said slider body.

7. A rigid disk drive according to claim 1, wherein said cam assembly is movable in a direction radial with respect to said rigid disk to permit adjustment of a loading position of said slider body above said surface of said disk.

8. A rigid disk drive according to claim 3, wherein said cam surface includes a contour which permits rotational movement of said actuator arm in a direction opposite to the direction of rotation of said actuator arm during positioning of said slider body over the surface of said rigid disk and in an amount sufficient to permit installation of said rigid disk without interference with said actuator arm.

9. A rigid disk drive according to claim 4, wherein said cam surface includes a contour which permits rotational movement of said actuator arm in a direction opposite to the direction of rotation of said actuator arm during positioning of said slider body over the surface of said rigid disk and in an amount sufficient to permit installation of said rigid disk without interference with said actuator arm.

10. A rigid disk drive according to any of claims 1-9, wherein said lift tab is cylindrical.

11. A rigid disk drive according to claim 1, including another arm pivotally supported on said baseplate for rotation of a first end of said other actuator arm in a plane substantially parallel to the opposite surface of said disk, another slider body including a read/write recording element, means connected to said other actuator arm and said other slider body for supporting said other slider body adjacent to said first end of said other actuator arm, said actuator arms being positioned such that their respective slider bodies are in facing relationship, and wherein said drive further includes a planar plate supported on said baseplate adjacent to an edge of said disk and positioned such that said plate is intermediate said slider bodies when said slider bodies are in an unloaded position away from said disk surface.

12. A rigid disk drive comprising:
    a baseplate;
    a rigid disk supported on said baseplate for rotation;
    an elongated actuator arm pivotally supported about a center of rotation on said baseplate for rotation of a free end of said arm in a plane substantially parallel to a surface of said rigid disk, said actuator arm further including a lift tab extending from said free end of said actuator arm along an axis which is skewed from the longitudinal axis of said actuator arm;
    a slider body including a read/write recording element;
    means connected to said arm and said slider body for supporting said slider body adjacent to said free end of said arm; and
    a cam assembly supported on said baseplate adjacent to said lift tab and the edge of said disk, said cam assembly including a cam surface positioned in operative relationship with said lift tab such that said lift tab contacts said cam surface at a position such that a positive roll attitude is imported to said slider body during positioning of said slider body over a surface of said rigid disk, said cam assembly being movable with respect to said center of rotation of said actuator arm whereby the distance between said center of rotation and a contact position between said cam surface and said lift tab is variable to permit adjustment of the amount of roll imparted to said slider body.

13. A rigid disk drive comprising:

a baseplate;

a rigid disk supported on said baseplate for rotation;

an elongated actuator arm pivotally supported about a center of rotation on said baseplate for rotation of a free end of said arm in a plane substantially parallel to a surface of said rigid disk, said actuator arm further including a lift tab extending from said free end of sad actuator arm along an axis which is skewed from the longitudinal axis of said actuator arm;

a slider body including a read/write recording element;

means connected to said arm and said slider body for supporting said slider body adjacent to said free end of said arm; and a cam assembly supported on said baseplate adjacent to said lift tab and the edge of said disk, said cam assembly including a cam surface positioned in operative relationship with said lift tab such that said lift tab contacts with said cam surface at a position such that a negative roll attitude is imported to said slider body during positioning of said slider body over a surface of said rigid disk, said cam assembly being movable with respect to said center of rotation of said actuator arm whereby the distance between said center of rotation and a contact position between said cam surface and said lift tab is variable to permit adjustment of the amount of roll imparted to said slider body.

14. A rigid disk drive comprising:

a baseplate;

a rigid disk supported on said baseplate for rotation;

an elongated actuator arm pivotally supported on said baseplate for rotation of a free end of said arm in a plane substantially parallel to a surface of said disk, said actuator arm further including a lift tab extending from said free end of said actuator arm along an axis which is skewed from the longitudinal axis of said actuator arm;

a slider body including a read/write recording element;

means connected to said arm and said slider body for supporting said slider body adjacent to said free end of said arm; and a cam assembly supported on said baseplate adjacent to said lift tab and the edge of said disk, said cam assembly including a cam surface positioned in operative relationship with said lift tb such that the lift tab in cooperation with said cam surface imparts a roll to said slider body when said slider body is being moved into position over the surface of said disk, said cam assembly being movable in a direction radial with respect to said rigid disk to permit adjustment of a loading position of said slider body above said surface of said disk.

* * * * *